United States Patent
Farrell et al.

(10) Patent No.: US 8,627,289 B2
(45) Date of Patent: *Jan. 7, 2014

(54) DETECTING CONFIGURATION PROBLEMS IN AN ECLIPSE-BASED SOFTWARE APPLICATION

(75) Inventors: Peter L. H. Farrell, Kanata (CA); Sudarsha D. A. Wijenayake, Nepean, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/465,073

(22) Filed: May 7, 2012

(65) Prior Publication Data

US 2012/0222011 A1    Aug. 30, 2012

Related U.S. Application Data

(63) Continuation of application No. 12/018,684, filed on Jan. 23, 2008, now Pat. No. 8,230,397.

(51) Int. Cl.
 *G06F 9/44* (2006.01)
(52) U.S. Cl.
 USPC ........... 717/124; 717/107; 717/126; 717/168; 717/174; 714/2; 714/25; 714/38.1
(58) Field of Classification Search
 USPC .......................................................... 717/124
 See application file for complete search history.

(56) References Cited

U.S. PATENT DOCUMENTS

| | | | | |
|---|---|---|---|---|
| 6,601,233 | B1 * | 7/2003 | Underwood | 717/102 |
| 6,640,317 | B1 * | 10/2003 | Snow | 714/38.1 |
| 6,684,242 | B1 * | 1/2004 | Bahlmann | 709/222 |
| 6,766,481 | B2 * | 7/2004 | Estep et al. | 717/124 |
| 7,024,548 | B1 * | 4/2006 | O'Toole, Jr. | 713/1 |
| 7,139,999 | B2 * | 11/2006 | Bowman-Amuah | 717/101 |
| 7,900,201 | B1 * | 3/2011 | Qureshi et al. | 717/174 |
| 8,434,057 | B2 * | 4/2013 | Ashish et al. | 717/106 |
| 2004/0193709 | A1 * | 9/2004 | Selvaggi et al. | 709/224 |
| 2006/0248405 | A1 * | 11/2006 | Ponczak et al. | 714/38 |
| 2007/0006039 | A1 * | 1/2007 | Fichter et al. | 714/38 |
| 2007/0079291 | A1 * | 4/2007 | Roth | 717/124 |
| 2008/0098360 | A1 * | 4/2008 | Klinger et al. | 717/128 |
| 2008/0229284 | A1 * | 9/2008 | Castro et al. | 717/124 |
| 2009/0070752 | A1 * | 3/2009 | Alpern et al. | 717/148 |

OTHER PUBLICATIONS

Title: ScatterEditor: An Eclipse based Tool for Programming, Testing and Managing Wireless Sensor Networks, author: Al Saad et al, source: IEEE, dated: 2007.*

* cited by examiner

*Primary Examiner* — Chameli Das
(74) *Attorney, Agent, or Firm* — Patents on Demand P.A.; Brian K. Buchheit; Scott M. Garrett

(57) ABSTRACT

Detecting configuration problems in an ECLIPSE-based software application can be detected. Such a method can begin with the receipt of a user-command to test a configuration of an ECLIPSE-based software application or with a detection of a feature addition/update when an auto-testing feature is enabled. Information about the available sites for the ECLIPSE-based application can then be obtained. Then, a list of software elements required to operate the ECLIPSE-based software application can be compiled. At least one data attribute can be extracted from the meta data of each software element in the compiled list. The extracted data attributes can then be analyzed. When the analysis identifies a configuration problem, the existence of the configuration problem can be validated.

18 Claims, 2 Drawing Sheets

DETECTING CONFIGURATION PROBLEMS IN AN ECLIPSE-BASED SOFTWARE APPLICATION

CROSS-REFERENCE TO RELATED APPLICATIONS

This application is a continuation of U.S. patent application Ser. No. 12/018,684, filed Jan. 23, 2008 (pending), which is incorporated herein in its entirety.

BACKGROUND

The present invention relates to the field of software testing.

ECLIPSE is an open-source software framework based on the Rich Client Platform (RCP) that utilizes discrete elements called "plug-ins" to extend its capabilities. ECLIPSE is often used as a software integrated development environment (IDE) used in the development of ECLIPSE-based applications. An ECLIPSE-based application, therefore, consists of a myriad of plug-ins that provides the application's functionality. Plug-ins are grouped with elements that handle input/output language translation called "fragments" to comprise a "feature". Every feature contained in the ECLIPSE-based application must be available and properly versioned in order for the application to function properly. Missing, corrupted, or improperly versioned features perpetrate a multitude of configuration errors within the application.

Further, elements called "feature patches" are used to update the existing features of an application, similar to the patching process of non-ECLIPSE-based software applications. Feature patches must also adhere to the same rules of versioning, availability, and dependencies in order to properly update their corresponding feature. The failure of a feature patch to properly install typically goes unnoticed by a user and simply causes additional application errors due to the improper configuration.

While there are a variety of tools available that test the software code of plug-ins for functionality, there is currently a lack of an automated tool that detects configuration problems between the various features and feature patches that comprise an ECLIPSE-based application. The ECLIPSE framework does not contain an inherent utility feature that addresses this issue. Therefore, the only option available at present is to manually verify every feature and feature patch of an ECLIPSE-based application. For a small application, this is an adequate solution. However, most ECLIPSE-based applications consist of hundreds or thousands of features and feature patches, which render a manual process inefficient, time-consuming, and excessively costly. This large quantity of features and feature patches also makes it impossible to address this issue within the formal testing cycle of the software application.

What is needed is an automated solution that detects configuration problems in an ECLIPSE-based software application. That is, the solution would automatically analyze all the features and feature patches of an ECLIPSE-based application to determine the existence of configuration errors and/or concerns. Ideally, such a solution would provide a report of any identified configuration problems with recommended resolutions.

BRIEF SUMMARY

The present invention can be implemented in accordance with numerous aspects consistent with material presented herein. For example, one aspect of the present invention can include software conforming to an ECLIPSE framework for configuration testing of features and feature updates. The software can be configured to analyze a set of features and feature patches of an ECLIPSE-based application, to determine an existence of configuration problems if any, and to report determined configuration problems. The software can be implemented as a set of programmatic instructions digitally encoded in a machine readable media and executable by at least one computing device.

Another aspect of the present invention can include an automated method for detecting configuration problems in an ECLIPSE-based software application. Such a method can begin with the receipt of a user-command to test a configuration of an ECLIPSE-based software application or with a detection of a feature addition/update when an auto-testing feature is enabled. Information about the available sites for the ECLIPSE-based application can then be obtained. Then, a list of software elements required to operate the ECLIPSE-based software application can be compiled. At least one data attribute can be extracted from the meta data of each software element in the compiled list. The extracted data attributes can then be analyzed. When the analysis identifies a configuration problem, the existence of the configuration problem can be validated.

Still another aspect of the present invention can include an automated system that detects configuration problems of an ECLIPSE-based software application. Such a system can include an ECLIPSE-based software application and a configuration test utility. The ECLIPSE-based software application can be configured to operate in an ECLIPSE framework and consist of multiple software elements. Each software element can include metadata defining operational data. The configuration test utility can be configured to determine the existence of configuration problems between the software elements of the ECLIPSE-based software application. The configuration test utility can produce a test report containing determined configuration problems.

DETAILED DESCRIPTION

Embodiments of the present invention disclose an automated solution that detects configuration problems in an ECLIPSE-based software application. The automated solution can include a configuration test utility to detect configuration problems between the various software elements of the ECLIPSE-based software application. The configuration test utility can interface directly with the software elements of the ECLIPSE-based software application using an Application Programming Interface (API). A test report can be generated that details detected configuration problems and recommend solutions for the problems.

Figure 1:
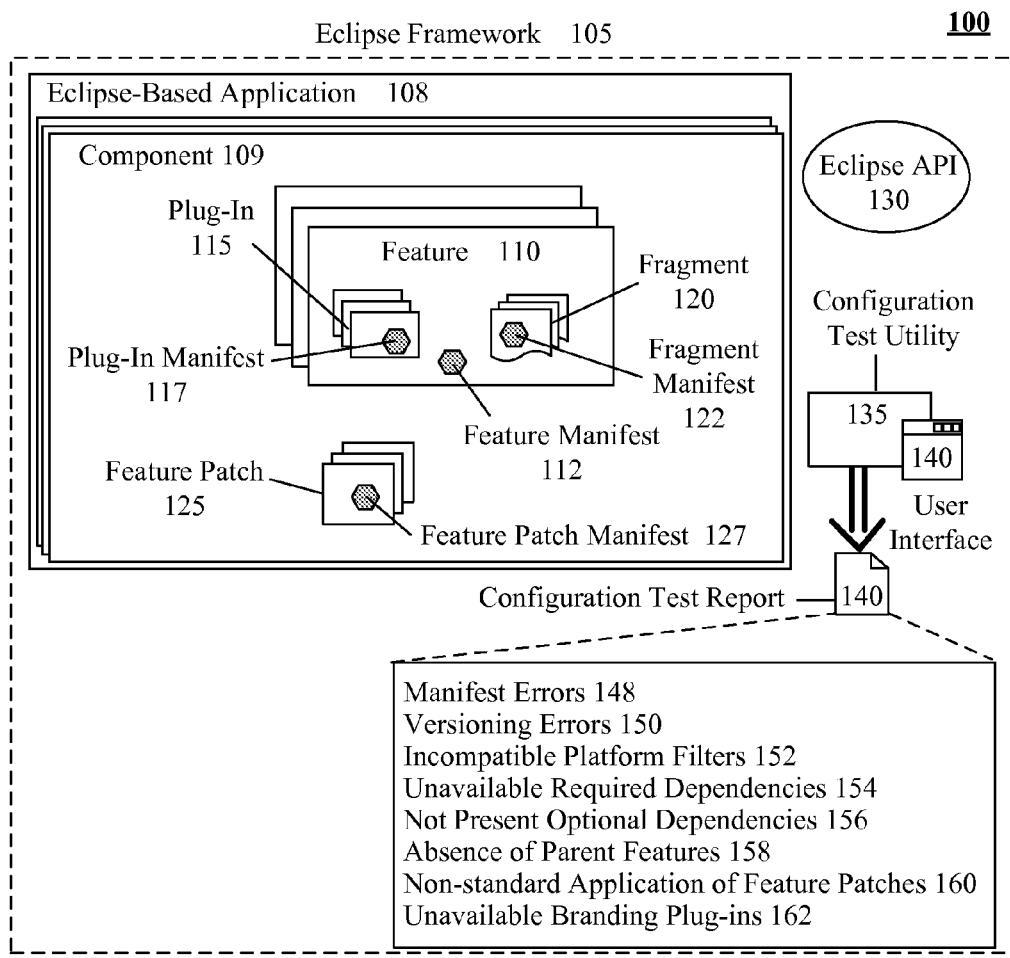
FIG. 1 is a schematic diagram of a configuration test utility for an ECLIPSE-based application in accordance with an embodiment of the inventive arrangements disclosed herein.

FIG. 1 is a schematic diagram of a configuration test utility for an ECLIPSE-based application 108 in accordance with an embodiment of the inventive arrangements disclosed herein.

The ECLIPSE-based application 108 can conform to standards of an ECLIPSE framework 105. The application 108 can include a number of features 110 and feature patches 125, which can be extended through use of a set of plug-ins 115, which introduce functionality to the application 108. Fragments 120 can be optionally utilized to internationalize plug-ins 115 by providing translations for the externalized strings of the plug-ins 115 in order for the functionality provided by the plug-ins 115 to be seen and used in different languages. Features 110 can group plug-ins 115 and fragments 120, which permits the plug-ins 115 and fragments 120 to be installed, uninstalled, enabled, and disabled as sets instead of individually. Feature patches 125 provide updates to bundles packaged within the features 110.

Each plug-in 115, fragment 120, feature 110, and patch 125 in the ECLIPSE framework 105 can be associated with a manifest 117, 122, 112, 127. An associated plug-in 115, fragment 120, feature 110, and patch 125 must have a valid manifest 117, 122, 112, 127 in order for it to be integrated with the ECLIPSE-based application 108 of framework 105. A feature 110 or patch 125 with an invalid, corrupted, or that lacks a manifest will neither install nor resolve. When a plug-in 115 or fragment 120 is not properly installed, it will provide no functionality to the application 108, even if the particular bundle was physically present in the build. Although it can be extremely important to identify such features 110 and patches 125 during software deployment and quality assurance phases of a software cycle, conventional systems provide little assistance in this regard.

Hence, an introduction of the configuration test utility 135 into framework 105. The utility 135 can detect any number of possible configuration errors occurring when attempting to install/update a feature 110 or feature patch 125. These errors can include, but are not limited to manifest errors 148, versioning errors 150, incompatible platform filters 152, unavailable required dependencies 154, unavailable optional dependencies 156, absence of parent features 158, non-standard application of feature patches 160, unavailable branding plug-ins 162, and the like. Each of these errors can be categorized and presented in a configuration test report 140. Manifest errors 148 refer to a lack of a required manifest 112, 117, 122, and/or 127 or an error that causes one of the manifest 112, 117, 122, and/or 127 to be unable to be read by the framework 105. The other errors 150-162 shall be elaborated upon in turn.

In one embodiment, the configuration test utility 135 can be part of the framework 105 externally implemented from the application 108, which is able to interact through an ECLIPSE API 130. For example, the utility 135 can be part of a software development application. Developers can be provided with a user interface 137 through which they can configure the utility, execute functions of the utility 135, and view/print generated reports 140. Configuration options for the utility 135 are many, which can include testing for only a subset of possible configuration errors, adding new developer defined configuration error tests to be executed by the utility 135, adding customized reports 140, utilizing SQL queries to view/manipulate configuration data produced by the utility 135, and the like.

The invention is not limited to being implemented as an external developer utility. In one contemplated embodiment, for example, the utility 135 can be a component of the application 108 itself, which automatically tests for configuration issues when a feature 110 or feature patch 125 is applied to the application 108. The test utility 135 can for example, execute in a "hidden" fashion when new features 110 or patches 125 are applied unless configuration errors are detected, in which case the application of the features/patches can be aborted and a report 140 and/or notification of the errors can be presented.

Additionally, the utility 135 can be implemented as a feature 110, where various testing rules used to generate the reports 140 are able to be added and modified as individual plug-ins 115 of the feature 110. This permits functionality of the configuration test utility 135 to evolve and to be adapted to handle new configuration issues and to be adjusted for new ECLIPSE framework 105 standards as they emerge.

Regardless implementation specifics, the utility 135 can detect a variety of different configuration problems, which are detailed in generated reports 140. An overview of various ones of these reportable errors 150-162 is now provided, which emphases a magnitude of issues relating to ECLIPSE framework 105 configuration, and which emphasis a need for and a value inherent in the configuration test utility 135. In detailing the various errors 150-162, error causes are identified. Each of these causes is detectable by the utility 135 using a set of programmatically implemented error detection rules.

Versioning Errors

Versioning errors 150 occur when a feature 110 or patch 125 fails to comply with ECLIPSE Versioning Conventions. These conventions mandate that the version of a feature 110 or patch 125 be placed in the form: major.minor.service.qualifier. The major, the minor and the service identifiers must be numerals. The qualifier on the other hand may contain numerals or strings at the developer's convenience. In addition, the version must not contain extra identifiers than the allowed options. The version of a feature 110 or patch 125 will be reset to as 0.0.0 by the ECLIPSE framework 105 at the time the bundle is being resolved if the version violates these standards. A set of versioning rules can be included in the test utility 135, which check to ensure that the ECLIPSE Versioning Conventions are followed. When violations to these conventions occur, explicit violation messages and suggestions to resolve these versioning problems can be included in the test report 140. The rules utilized by the utility 135 can be updated/changed as corresponding ECLIPSE Versioning Conventions are altered.

Experience has shown that the software developers, especially ones new to ECLIPSE, sometimes fail to follow the versioning conventions. As a result, the features 110 and patches 125 delivered by such individuals occasionally fail to install or even resolve in the application 108 even though such bundles are physically present in the build.

The following example illustrates how important is it identify when features 110 and patches 125 violate the ECLIPSE Versioning Convection. These violations can have many side-effects when installation attempts are made, which cause an application 108 to behave in an unpredictable fashion. The utility 135 can prevent problems related to the following example, in an efficient and straight forward fashion. In contrast, a traditional approach has been to manually detect such issues, which can be nearly impossible when an application 108 is composed of a large number of features 110 and patches 125.

To illustrate, assume that a Feature F1 Version 1.0.0 is developed for application 108. This particular feature packages the Plug-in P1 Version 1.0.0. The Version 1.0.0 of the Feature F1 does comply with the ECLIPSE Versioning Convention. Therefore, the particular feature will properly install and resolve in the application 108. The version of this feature will be registered as 1.0.0 in the ECLIPSE Runtime as exactly marked in its feature manifest 112 (i.e. feature.xml file).

Imagine that a newer Version 2.0.0b of the same Feature F1 is introduced to the application 108 at a later time. This particular version of the feature packages a brand new Plug-in P2 Version 1.0.0 and a newer Version 2.0.0 of the existing Plug-in P1. As you may see, the service identifier 0b of the Version 2.0.0b of the Feature F1 isn't numeric (contains the character b). Therefore, the Version 2.0.0b is considered invalid according to the ECLIPSE Versioning Convention. Attempts to install this particular feature would not be permitted by the ECLIPSE Update Manager. If the Feature F1 Version 2.0.0b did not properly install for any reason, the bundles that it packages, such as the brand new Plug-in P2 and the newer Version 2.0.0 of the existing Plug-in P1, would not install in the application 108. If the Plug-in P1 version 2.0.0 and the Plug-in P2 version 1.0.0 did not install in the application 108, they would provide no functionality to the application 108 even though their versioning does perfectly comply with the ECLIPSE Versioning Convention.

Appreciably, a feature 110 can be installed in ECLIPSE without relying on the functionality provided by the ECLIPSE Update Manager, which includes an internal versioning check that prevents installations having versioning errors. For instance, certain ECLIPSE configurations allow its users to install a feature 110 in the application 108 by manually copying the particular feature 110 and its contents to the build. If it was the method of installation used in the previous example, the Feature F1 Version 2.0.0b would have installed in the application 108. However, its version would still violate the ECLIPSE Versioning Convention; therefore, it will be reset to 0.0.0 by the ECLIPSE Runtime. Now there are two versions 1.0.0 and 0.0.0 (originally 2.0.0b) of the Feature F1 available in the application 108. The Version 1.0.0 is greater than 0.0.0, therefore, the former (Version 1.0.0 of the Feature F1) would resolve in the application 108. The Version 0.0.0 of the Feature F1 would be disabled even though it was the newer version.

If the Feature F1 Version 0.0.0 (originally 2.0.0b) did not resolve as mentioned, the bundles that it packages might not resolve or install in the application 108. This means that the plug-ins P1 Version 2.0.0 and P2 Version 1.0.0 would not resolve and, therefore, provide no functionality to the application 108 even though not only these bundles are physically available to the application 108, but also their versioning perfectly comply with the ECLIPSE Versioning Convention.

Experience demonstrates that there is a probability for at least one of the two plug-ins, P1 Version 2.0.0 and P2 Version 1.0.0, packaged by the Feature F1 Version 2.0.0b to resolve under these conditions even with the absence of their parent. If the latter was the outcome, the resolved Version 1.0.0 of the Feature F1 would suffer from configuration related errors due to the resolution of the Plug-in P1 Version 2.0.0. It has been witnessed that a feature 110 or patch 125 with configuration related errors could prevent the user from upgrading not only the given feature 110, but also the remaining features 110 in the application 108 as well. In addition, such a feature 110 may restrict the user from installing new features 110 in the application 108 since adding new functionality to an application 108 with configuration errors could make the application 108 even more unstable.

Incompatible Platform Filters

The platform filter of a feature 110 or patch 125 specifies the platform that the particular bundle is allowed to resolve. For instance, the following platform filter specifies that the corresponding bundle must only resolve on a platform running on an x86 architecture and using a Linux operating system built on the Motif windowing system.

(& (osgi.arch=x86) (osgi.os=linux) (osgi.ws=motif))

If a feature 110 with the above platform filter was included into an application 108 developed for the WINDOWS platform for instance, the targeted feature 110 would not resolve. Consequently, the plug-ins 115 and fragments 129 packaged by the particular feature 110 would not resolve either. It would, therefore, contribute no functionality to the application 108 even though the bundles are available to the application 108.

Hence, attempting to include a feature 110 designed for one platform into an application 108 developed for another platform not only fails to work, but also increases a size of the application 108 unnecessarily. Experience demonstrates that features 110 and patches 125 designed for one platform are sometimes mistakenly included into applications 108 developed for another platform due to various reasons. It is usually a responsibility of a release engineer to identify such bundles and remove them from the application 108 as quickly as possible.

It has also been witnessed that developers, especially those new to the ECLIPSE framework 105, sometimes assign incorrect platform filters to features 110, which renders that features 110 ineffective on the targeted platform. The release engineer must identify such bundles and correct their platform filters as quickly as possible, which can be a process facilitated by utility 135, which is able to detect and report incompatible platform filters 154.

Unavailable Required Dependencies

A feature 110 or patch 125 packages plug-ins 115 and fragments 120 by grouping them together in order for them to be installed, uninstalled, enabled and disabled as groups instead of individuals. The bundles packaged by a feature 110 or patch 125 are often referred to as the included dependencies of the particular feature 110 or patch 125 for simplicity. In addition, a feature 110 or patch 125 may require the existence of other plug-ins 115 or fragments 210 in order for its included dependencies to resolve and function in the application 108. The plug-ins 115 and fragments 120 required by a feature 110 or patch 125 are often referred to as required dependencies of the particular feature 110 or patch 125. Both the included and required dependencies of a feature 110 or patch 125 form strong hierarchical associations between features 110, patches 125, plug-ins 115, and fragments 120. It is mandatory that all of the included and required dependencies of a feature 110 or patch 125 to resolve and be configured properly in the application 108. A feature 110 or patch 125 failing to satisfy the above requirement would suffer from configuration related errors which might ultimately prevent the user from updating the application 108.

To illustrate by example, a feature identified as F1 can package a second Feature F2 (i.e. included dependency). The Feature F2 can depend upon the functionality included by a feature identified as F3 (i.e. required dependency) and the Feature F3 can package a feature identified as F4 (i.e. included dependency again). In this particular example, the Feature F1 requires the second Feature F2 to exist and resolve in the application 108 in order for it to be properly configured. In addition, the Feature F2 must be properly configured, meaning, all of its included and required dependencies must also exist and resolve in the application 108. If and only if both of these criterions were met, the Feature F1 would function properly in the application 108. Additionally, the Feature F2 can require the existence of its required dependency F3 and the dependencies of the feature F3 in the application 108. Finally, the Feature F3 can require the existence of the Feature F4 and the dependencies of the Feature F4 in the application 108.

This complex hierarchical dependency structure mandates the existence and the resolution of all of its participants and their (included and required) dependencies in order for the Features F1, F2, F3, and F4 to function properly in the application 108. In this example, the Feature F4 can be mistakenly excluded from the application 108. In such a situation, the complete hierarchical dependency structure would collapse by causing configuration related errors in the remaining Features F1, F2, and F3.

It has been witnessed that a feature 110 or patch 125 with configuration related errors could prevent the user from upgrading not only the given feature 110, but also the remaining features 110 in the application 108. In addition, such a feature 110 may restrict the user from installing new features 110 in the application 108 since adding new functionality to the application 108 with configuration errors could make the application 108 even more unstable.

In this particular example, if a release engineer had somehow known that the Feature F4 was missing from the application 108 and that was what was causing configuration related errors in the remaining Features F1, F2 and F3, then this particular issue could have been resolved by simply introducing the missing Feature F4 and its contents to the application 108. Configuration test utility 135 can assist in identifying that the unavailability of the Feature F4 was the root cause of the problem so that suitable problem resolution actions can be taken.

Unavailable Optional Dependencies

If a dependency of a feature 110 or patch 125 is made optional, the associated feature 110 or patch 120 does not suffer from configuration related errors through the particular dependency was not available in the application 108. This behavior of the ECLIPSE framework 105 makes the feature development more flexible, but introduces a new breed of issues and challenges in the fields of Software Quality Engineering and Release Engineering, which can be detected and reported by utility 135.

To illustrate, a feature identified as F1 has an optional dependency F2. Under these circumstances, the Feature F1 would not suffer from configuration related errors even though the Feature F2 was mistakenly excluded from the application 108. In addition, the ECLIPSE framework 105 can conclude that the Feature F1 must be properly configured and therefore raise no concerns about the unavailability of its dependency on the Feature F2 even though the particular feature (F2) was excluded from the application 108 by accident. The utility 135 can report in the optional dependencies section 156 of report 140 that Feature F2 is an optional dependency of Feature F1, which is lacking in the application 108.

Absence of Parent Features of Feature Patches

A feature patch 125 provides updates to the bundles packaged by the feature 110 that it was implemented for. Therefore, a patch 125 should be resolved if and only if the feature 110 that it was implemented for was available and resolved in the application 108.

Patches 125 do resolve in the ECLIPSE framework 105 under certain circumstances even in the absence of the parent features. In addition, the ECLIPSE framework 105 can conclude that the feature patch 125 must be properly configured and therefore raise no concerns about the unavailability of its parent feature what so ever. When a parent feature is absent, the test utility 135 can specify so in an absence of parent features 158 section of report 140.

Non-Standard Applications of Feature Patches

The topic of feature patches 125 and their associated functionality often isn't well defined or documented. As a result, the feature patches 125 are often misused in ECLIPSE based applications 108, which can result in fatal configuration related errors in the corresponding features 110 and patches 125.

To illustrate, implementing a feature patch 125 to introduce an earlier release (version) of a set of plug-ins 115 and fragments 120 when a newer release of the corresponding plug-ins and fragments have been introduced by the parent feature 110 of the particular patch 125, is considered a non-standard application. Similarly, implementing a feature patch 125 to reintroduce a set of plug-ins 115 and fragments 120 when the same release of the corresponding plug-ins and fragments have been introduced by the parent feature 110, also falls into this category. Furthermore, implementing a feature patch 125 with a platform filter that is incompatible with the platform filter of the parent feature 110, is too considered a non-standard application A feature 110 or patch 125 with configuration related errors often prevents a user from upgrading not only the given feature 110, but also the remaining features 110 in the application 108. Further, such a feature 110 may restrict the user from installing new features 110 in the application 108 since adding new functionality to an application 108 with configuration errors could make the application 108 even more unstable. The utility 135 can detect and define a set of non-standard application of feature patches 160 within a section of the report 140.

Unavailable Branding Plug-Ins

A branding plug-in 115 brands a given feature 110 by providing the feature 110 with customized messages, logos, icons, license agreements, contact information, help documents, etc. that are exploited in the ECLIPSE About Dialog and its associated functionality. The ECLIPSE framework 105 has one feature-branding-plug-in combination to brand itself. An Eclipse-Based Application 108 may introduce a feature-branding-plug-in combination for each component 109 included in the particular application.

It is not required for each feature 110 in an ECLIPSE based application 108 to have a branding plug-in. However, it is recommended for an application 108 to consist of a feature-branding-plug-in combination to brand itself. If the application 108 encapsulates other external applications and/or modules, then each one of the external components in the application 108 may also carry a unique feature-branding-plug-in combination in order to provide the application 108 with their branding information. An average Eclipse-Based Application 108 may consist of a large number of features 110. Quite a few of these features 110 may be designed to deliver their own branding plug-ins to the application in order to brand the components 109 that they belong to. Mistakenly excluding any of the branding plug-ins from the particular Eclipse-Based Application 108 or such a plug-in failing to resolve would result in the absence of the associated branding information in the application. The unavailable branding plug-in 162 section of report 140 can identity potential branding problems and inconsistencies.

User Interface Description

Figure 2:
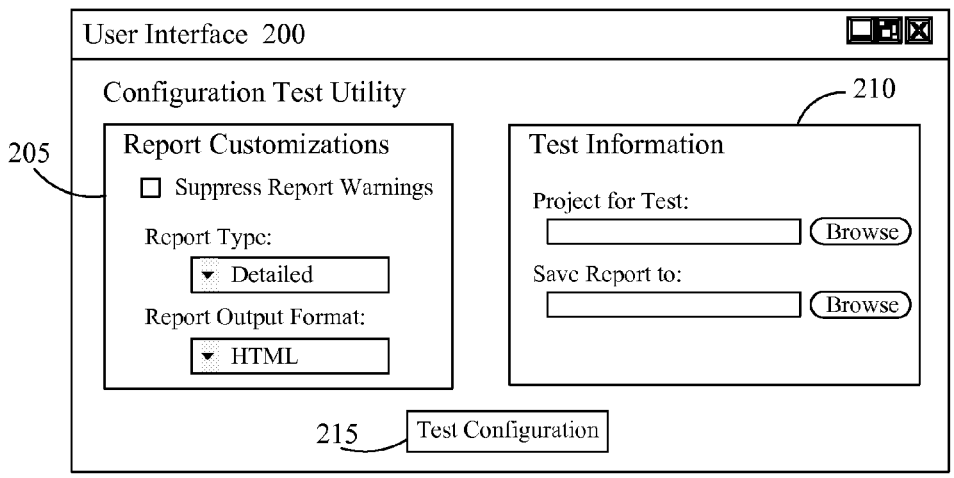
FIG. 2 is a sample user interface for a configuration test utility in accordance with an embodiment of the inventive arrangements disclosed herein.

FIG. 2 is a sample user interface 200 for a configuration test utility in accordance with an embodiment of the inventive arrangements disclosed herein. The interface 200 can be an interface in one embodiment of the system 100. The interface 200 is presented for illustrative purposes only and derivative and alternative interfaces are contemplated.

Interface 200 can permit a user to customize reports and to specify details of the test information 210 to be used by a configuration test utility. A selection button 215 can trigger a testing operation, which results in a configuration test report. Various options can be selected from interface 200, such as an option 205 to ignore warnings that are found with regard to features, patches, plug-ins, and fragments of a product.

Flow Chart of a Configuration Tester

Figure 3:
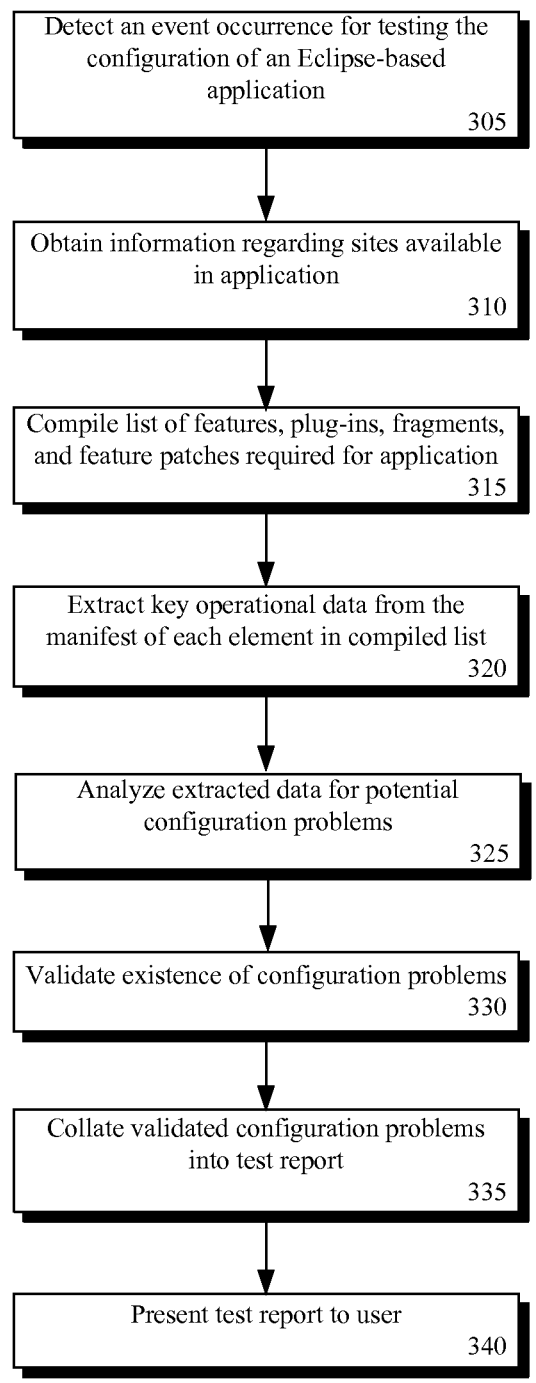
FIG. 3 is a flow chart of a method for performing configuration tests in accordance with an embodiment of the inventive arrangements disclosed herein.

FIG. 3 is a flow chart of a method 300 for performing configuration tests in accordance with an embodiment of the inventive arrangements disclosed herein. The method 300 can be performed in a context of a system 100.

Method 300 can begin in step 305, where an event that triggers a configuration test of an ECLIPSE based application can be detected. In one embodiment, the triggering event can be a user selection of a test command within a configuration test interface. In another embodiment, the configuration test event can be automatically triggered when a feature or feature patch is applied to an application. In order to find potential configuration issues, a configuration utility can initially seek information about the sites available in a given application, as shown by step 310. Sites are defined as locations containing features and patches that compose an application. Once the sites have been located, a list of features, plug-ins, fragments, and feature patches required for the application can be compiled.

In step 320, key operational data can be extracted from the manifest of each element in the compiled list. Extracted data can include, but is not limited to, feature identification, version, platform filters (e.g., platform, architecture, language, and other constraints), a set of included plug-ins, fragments, features, and patches, a set of required plug-ins, fragments, features, and patches, an identification of a branding plug-in if available, and other information. In step 325, the extracted data can be analyzed for potential configuration problems. A set of configuration problem specific rules (e.g., rules for versioning, for platform filters, for dependencies, for handling parent features, for determining non-standard feature patch issues, for branding issues, etc.) can be used during step 325. In one embodiment, these rules can be updateable to ensure concurrency with current ECLIPSE standards and/or to permit developers to establish and test project specific constraints. In step 330, any detected configuration problems can be validated. In step 335, validation configuration problems can be collated into a test report, which can be presented to a user in step 340 or stored at a designated memory space for later examination.

The present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. A method comprising: at least one computing device receiving a user-command to test a configuration of an ECLIPSE-based software application, wherein the ECLIPSE-based software application includes a plurality of software elements;
   at least one computing device obtaining available sites for the ECLIPSE-based application;
   at least one computing device compiling a list of software elements required to operate the ECLIPSE-based software application; extracting a set of at least one data attribute from a set of meta data for each software element contained in the compiled list of software elements; analyzing the set of data attributes extracted for each software element; and
   at least one computing device, if a result of the analyzing step determines an existence of a configuration problem, validating the existence of the configuration problem, wherein the ECLIPSE-based software application comprises a plurality of discrete features each separately versioned, wherein a hierarchical dependency structure exists between the discrete features, which must be satisfied for the ECLIPSE-based application to function properly, wherein the analyzing the set of data attribute further comprises analyzing the hierarchical dependency structure to determine if the specific feature of the bundle is able to be installed or upgraded for the ECLIPSE-based application given installed versions of the discrete features of the ECLIPSE-based application and given the included dependencies.

2. The method of claim 1, wherein further comprising: generating a test report containing results of the analyzing and the validating, if executed, wherein the test report includes a recommended solution for the configuration problem.

3. The method of claim 2, wherein the results in the test report are grouped into at least one section, wherein the at least one section includes a missing software elements section, a missing meta data section, a versioning errors section, a platform filter issues section, an incomplete dependencies section, and a captured errors and warnings section.

4. The method of claim 1, wherein the configuration problems indicate that one of the features or feature patches is not properly installed.

5. The method of claim 4, wherein improperly installed features or feature patches provide no functionality to the ECLIPSE-based application whether or not bundles for the improperly installed features or feature patches are present in an application build.

6. The method of claim 5, ECLIPSE-based software application comprises a plurality of discrete features each separately versioned, wherein a hierarchical dependency structure exists between the discrete features, which must be satisfied for the ECLIPSE-based application to function properly.

7. The method of claim 1, wherein the set of extracted data attributes includes one of an element identifier, a version identifier, a set of platform filters, a set of included software elements, a set of required software elements, and an identification of a branding plug-in.

8. The method of claim 1, wherein the configuration problem represents an unmet operating condition of at least one of the ECLIPSE-based operating system, an ECLIPSE coding standard, and ECLIPSE framework.

9. The method of claim 1 further comprises at least one computing device attempting to install or update the specific feature from the bundle.

10. The method of claim 1, wherein the existence of the configuration problem refers to a dependency of the specific feature not able to be resolved by installing or updating one of the discrete features using the included dependencies of the bundle.

11. A system comprising: one or more processors, one or more non-transitory machine readable media; program instructions, stored on at least one of the one or more machine readable media for execution by at least one of the one or more processors;
  an ECLIPSE-based software application, comprising at least a portion of said program instructions, configured to operate in an ECLIPSE framework, wherein the ECLIPSE-based software includes a plurality of software elements, wherein each software element contains a set of meta data defining a plurality of operational data; and
  a configuration test utility configured to determine an existence of configuration problems between the plurality of software elements of the ECLIPSE-based software application, wherein the configuration test utility produces a test report containing determined configuration problems, wherein the configuration problems indicate that features or feature patches are not properly installed for the ECLIPSE-based software application, wherein improperly installed features or feature patches provide no functionality to the ECLIPSE-based software application whether or not bundles for the improperly installed features or feature patches are present in an application build, wherein the ECLIPSE-based software application comprises a plurality of discrete features each separately versioned, wherein a hierarchical dependency structure exists between the discrete features, which must be satisfied for the ECLIPSE-based application to function properly, wherein the system analyzes the set of data attribute by analyzing the hierarchical dependency structure to determine if the specific feature of the bundle is able to be installed or upgraded for the ECLIPSE-based application given installed versions of the discrete features of the ECLIPSE-based application and given the included dependencies.

12. The system of claim 11, wherein a configuration problem represents an unmet operating condition of at least one of the ECLIPSE framework, a software engineering standard, and an ECLIPSE standard, wherein the configuration test utility is configured to detect at least four of the following configuration problems: manifest error, a versioning error, an incompatible platform filter problem, an unavailable required dependency, an unavailable optional dependency, an absence of parent features, a non-standard application of feature patches, and an unavailable branding plug-in.

13. The system of claim 11, wherein the set of meta data is captured in a manifest document written in an Extensible Markup Language (XML), wherein the configuration test utility utilizes an Application Programming Interface (API) to interface with the plurality of software elements of the ECLIPSE-based software application, wherein the system further comprises:
  a user interface configured to accepting a user-configuration of at least one of the configuration test utility and the test report.

14. The system of claim 11, wherein the determined configuration problems of the test report are grouped into at least one section, wherein the at least one section includes a missing software elements section, a missing meta data section, a versioning errors section, a platform filter issues section, an incomplete dependencies section, and a captured errors and warnings section, wherein the test report includes a recommended solution for the determined configuration problems.

15. An apparatus comprising:
  a set of programmatic instructions digitally encoded in a non-transitory machine readable media, wherein said programmatic instructions are executable by at least one processor of at least one computing device, wherein said set of programmatic instructions are configured to analyze one or more features or feature patches of an ECLIPSE-based application, to determine an existence of configuration problems if any, and to report determined configuration problems, wherein the features or feature patches must have a valid manifest in order to be integrated within the ECLIPSE-based application that conforms to an ECLIPSE-based framework, wherein the configuration problems occur when attempting to install or update one of the features or feature patches, and wherein the configuration problems indicate that one of the features or feature patches is not properly installed, wherein improperly installed features or feature patches provide no functionality to the ECLIPSE-based application whether or not bundles for the improperly installed features or feature patents are present in an application build, wherein the ECLIPSE-based software application comprises a plurality of discrete features each separately versioned, wherein a hierarchical dependency structure exists between the discrete features, which must be satisfied for the ECLIPSE-based application to function properly, wherein the apparatus analyzes the set of data attribute by analyzing the hierarchical dependency structure to determine if the specific feature of the bundle is able to be installed or upgraded for the ECLIPSE-based application given installed versions of the discrete features of the ECLIPSE-based application and given the included dependencies.

16. The apparatus of claim 15, wherein the software is a component of an ECLIPSE development software tool able to be triggered based upon a user selection within a graphics based software development interface.

17. The apparatus of claim 15, wherein the software is at least one of a component of the ECLIPSE-based application and a software executable able to interact with the ECLIPSE-based application, wherein said software automatically executes when a new feature or feature update is applied to the ECLIPSE-based application, and wherein detection of a configuration problem during the automatic execution causes the application of the new feature or feature update to be aborted.

18. The apparatus of claim 15, wherein at least one of the configuration problems determined and reported by the software represents an unmet operating condition of at least one of the ECLIPSE framework, a software engineering standard, and an ECLIPSE standard, and wherein at least one of the configuration problems is one of a software element unavailability, a corruption of the set of meta data, an absence of the set of meta data, a violation of the at least one ECLIPSE standard, a conflict between version of the software element, an unfulfilled dependency between software elements, an absence of a branding plug-in, and an exclusion of a software element from the ECLIPSE-based software application.

* * * * *